F. LA O. LATHROP.
CURTAIN ROD SUPPORT.
APPLICATION FILED DEC. 30, 1908.
933,082.
Patented Sept. 7, 1909.
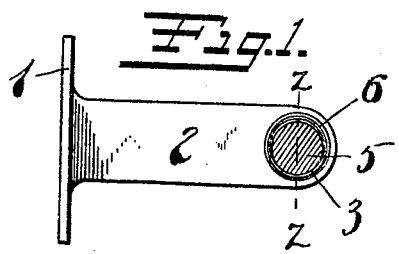
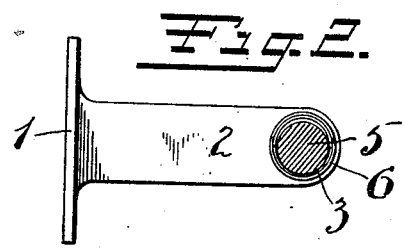
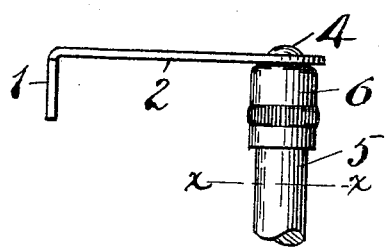
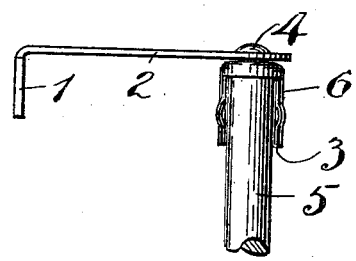
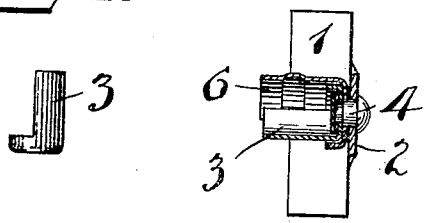
Witnesses:
Inventor
FRANK L. LATHROP
By his Attorneys

UNITED STATES PATENT OFFICE.

FRANK LA OTIS LATHROP, OF WALLINGFORD, CONNECTICUT, ASSIGNOR TO H. L. JUDD COMPANY, OF WALLINGFORD, CONNECTICUT, A CORPORATION OF NEW YORK.

CURTAIN-ROD SUPPORT.

933,082.      Specification of Letters Patent.      Patented Sept. 7, 1909.

Application filed December 30, 1908. Serial No. 469,936.

*To all whom it may concern:*

Be it known that I, FRANK LA OTIS LATHROP, a citizen of the United States, residing at Wallingford, county of New Haven, State of Connecticut, have invented certain new and useful Improvements in Curtain-Rod Supports, of which the following is a full, clear, and exact description.

My invention relates to improvements in brackets for curtain rods and the like.

The object of the invention is to provide a simple and inexpensive means for attaching and detaching and securely holding when attached, a curtain rod and a bracket therefor.

In the drawings Figure 1 is a view of the inside of a bracket and rod, the latter being shown in section on the line x—x of Fig. 3, and locked in place. Fig. 2 is a similar view showing the bracket open or unlocked for removal of the rod. Fig. 3 is a plan view of Fig. 1. Fig. 4 is a plan view of Fig. 2. Fig. 5 is a detail in section. Fig. 6 is a companion detail in section. Fig. 7 is a sectional view on the line z—z Fig. 1.

The bracket composes a suitable base 1 and a forwardly projecting arm or support 2 which carries at its outer end a rod support 3, which latter is secured in any suitable way to the arm 2, as by means of a rivet fastening 4. This support 3 may be made of a cup-shaped piece of metal cut away on one side to provide a side entrance for the rod 5, as indicated in Fig. 5.

6 is a lock or retainer which may also be formed of a cup-shaped piece of metal cut away at one side, as indicated in Fig. 6, to afford side entrance for rod 5 in a manner similar to the side entrance in the support 3. The retainer 6 is of slightly larger dimensions than the support 3 and surrounds the same, said retainer being held in place by having an inturned flange, which loosely surrounds the shank of the rivet fastening 4, there being a sufficient clearance space between the base of the support 3 and the arm 2 to receive said flange. The construction of the rivet support 4 is such that the part 3 will not turn, and yet it will be held sufficiently away from the arm 2 to provide the aforesaid clearance space for the retainer flange, as indicated in the sectional view, Fig. 7. The retainer 6 thus mounted may partake of rotary movement around the support 3, whereby when said retainer is turned so that the opening in its side registers with the opening in the side of the support 3 (see Fig. 2), the rod may be inserted or removed by a lateral movement thereof. When it is desired to lock the rod in place, the retainer 6 is turned so that its slotted portion will stand over the side opening in the support 3, thus closing the latter and forming a practically continuous tube surrounding the end of rod 5, holding the latter against removal. I have used the terms "support" and "retainer" as convenient forms of expression. Obviously, if the bracket is mounted so that the support is arranged above the rod, the retainer in that event would act as the support for the latter and hold the same with equal security. In this event, the rod would be inserted from the under side of the bracket rather than from above. I mention this in order that it may be clearly understood that either one of the parts 3—6 may act as the rod support without regard to the terms actually employed, it depending merely upon the position of attaching the bracket. So also the bracket may be suspended from above, in which event the rod would be supported partially by part 3 and partially by part 6.

It should be understood, of course, that the arm 2 may be employed as the base, in which event the part 1 would be cut off. This form would be employed where there is no desire to offset the rod 5.

What I claim is:

A curtain rod support comprising a base, a supporting element of tubular form mounted on said base, said supporting element having a side entrance, a clearance space between the rear of said support and said base, a retainer coöperating with said support and having a side entrance, a portion of said retainer projecting into said clearance space, said retainer being held in place by said base and support and being rotatable relatively to said base and support.

FRANK LA OTIS LATHROP.

Witnesses:
ALEXANDER CAMPBELL,
GEORGE W. BAUMAN.